US007942083B2

(12) United States Patent
Jordan

(10) Patent No.: US 7,942,083 B2
(45) Date of Patent: May 17, 2011

(54) APPARATUS AND METHOD FOR DEPRESSING BRAKE DRUM SPRINGS

(76) Inventor: Thomas Henry Jordan, King George, VA (US)

( * ) Notice: Subject to any disclaimer, the term of this patent is extended or adjusted under 35 U.S.C. 154(b) by 190 days.

(21) Appl. No.: 12/453,495

(22) Filed: May 13, 2009

(65) Prior Publication Data

US 2009/0223331 A1 Sep. 10, 2009

Related U.S. Application Data

(63) Continuation-in-part of application No. 29/288,306, filed on Jun. 7, 2007, now abandoned.

(51) Int. Cl.
*B25B 7/12* (2006.01)
*B23P 19/04* (2006.01)

(52) U.S. Cl. ............................... 81/371; 81/418; 29/227

(58) Field of Classification Search .................... 81/367, 81/371, 418, 427, 486; 269/6, 96, 97, 105, 269/143, 156, 170, 196, 197, 224, 229, 249, 269/258; 29/225, 227, 267, 268, 270, 278
See application file for complete search history.

(56) References Cited

U.S. PATENT DOCUMENTS

| | | | | |
|---|---|---|---|---|
| 2,505,564 | A * | 4/1950 | Meyer | 29/227 |
| 2,529,599 | A * | 11/1950 | Dick | 29/227 |
| 4,617,710 | A * | 10/1986 | Kotnik | 29/268 |
| 4,776,079 | A * | 10/1988 | Cameron | 29/268 |
| 5,058,414 | A | 10/1991 | Hayes | |
| 5,182,841 | A * | 2/1993 | Park et al. | 29/229 |
| 5,937,716 | A * | 8/1999 | Klann | 81/419 |
| 6,000,686 | A | 12/1999 | Yates | |
| 6,772,658 | B1 * | 8/2004 | Jasick | 81/418 |
| 7,228,770 | B2 * | 6/2007 | Rozo et al. | 81/418 |
| 2003/0005798 | A1 | 1/2003 | Kuchar | |

* cited by examiner

*Primary Examiner* — David B Thomas
(74) *Attorney, Agent, or Firm* — Richard C. Litman

(57) ABSTRACT

A c-clamp locking device has been specially modified to depress brake drum springs while the brake shoes are replaced. The device has opposing c-clamp jaws, one of which has a blunt end for compression against the surface of the brake drum, and the other of which has a ring for compressing the brake drum spring. The jaws are adjustable relative to each other. A locking mechanism enables the device to lock in place when the brake drum spring is appropriately compressed, allowing the mechanic to use both hands unencumbered when replacing brake shoes.

3 Claims, 2 Drawing Sheets

APPARATUS AND METHOD FOR DEPRESSING BRAKE DRUM SPRINGS

CROSS REFERENCE TO RELATED APPLICATIONS

This application is a Continuation in Part of Design patent application 29/288,306, filed Jun. 7, 2007 now abandoned, and claims benefit of the subject matter in common with that application.

STATEMENT REGARDING FEDERALLY SPONSORED RESEARCH OR DEVELOPMENT

This application was not funded or sponsored by any federal program or agency.

THE NAMES OF THE PARTIES TO A JOINT RESEARCH AGREEMENT

This application is not the subject of any joint research agreement.

BACKGROUND OF THE INVENTION

1. Field of the Invention

This application relates to tools especially adapted for changing brake shoes on an automobile, truck, or other vehicle that has a brake drum.

2. Description of Related Art

U.S. Pat. No. 5,058,414 issued to patentee Hayes, the disclosure of which is fully incorporated by reference herein, shows an electrical knock-out method and tool. Like the invention herein, the tool shown by Hayes uses a pliers like action. Hayes shows method of removing electrical box knock-outs which includes utilizing a hand tool which has elongated jaws, one with a ring and the other with a punch directed toward the center of the ring. By positioning the jaws on opposite sides of a box wall and closing the jaws, the punch and ring close on the knock-out and the punch deflects the knock-out through the ring so that the knock-out can then be twisted and removed by needle nose pliers.

The ring is preferably larger than the knock-out and the punch is smaller than the internal diameter of the ring and preferably about half that size. The tip of the punch may be designed to deflect the knock-out away from the wall on the side corresponding to the open face of the box. The punch may be lined up with a selected concentric ring edge to deflect and remove the ring. The tool may also be used to straighten inadvertently deflected rings or knock-outs. The tool is convenient to carry, may be operated with a single hand and saves significant time and aggravation in the wiring process. The tool of Hayes is not designed to operate on brake drums, nor does it have the advantageous vice-grip action of the instant invention.

U.S. Pat. No. 6,000,686 issued to patentee Yates shows a three-way clamp that locks closed using the action associated with a common vice-grip, the disclosure of which is fully incorporated by reference herein. In accordance with the various features of the Yates invention, a locking, three-way clamp is provided. The locking three-way clamp includes a handle, threaded adjusting screw and toggle lock typical of state of the art locking c-clamps or locking pliers. Opposing jaws that are in spaced relation are also provided. A workpiece restraint member is provided at the conjunction of the jaws and proximate the central pivot point around which the jaws pivot. The locking three-way clamp of the Yates invention also includes an engagement device disposed on the distal end of each jaw. Each engagement device includes a workhead that defines a point of contact between the clamp and a workpiece. Upon closure of the jaws such that the workhead engages the workpiece, the engagement device pivots inward towards the restraint member thus applying a vector force having a component vector towards the workpiece and a component vector towards the restraint member. Rather than overcoming the frictional force between the opposing workheads and the workpiece and forcing the three-way clamp off of the workpiece, as is problematic with state of the art three-way clamps, the resultant vector force forces the workpiece against the restraint member and forces the clamp towards the workpiece.

In one embodiment of the locking three-way clamp of Yates, the engagement device is defined by a pair of opposing, eccentrically mounted cams. In this regard, opposing cams are pivotally connected at the distal end of each jaw. The cams each rotate around the cam's eccentrically positioned pivot point. The cams are, preferably, spring-biased away from the closed position. Moreover, the cam is mounted such that the radius between the central pivot point of the clamp and the eccentrically positioned cam pivot is greater than the radius between the central pivot point of the clamp and the point of contact of the cam with the workpiece and further such that the point of contact of the cam with the workpiece is disposed inside a line between cam pivot points. This configuration allows the cams to rotate towards the restraint member when the jaws are closed and the cams engage the workpiece. As a result of this rotation, a bidirectional vector force which has essentially x- and y-component vectors is applied against the workpieces. This results in the workpieces being biased towards the restraint member.

In another embodiment of the locking three-way clamp of Yates, the engagement device is defined by a linkage assembly pivotally secured proximate the distal end of each jaw of the clamp, each linkage assembly including a pivotally mounted workhead. In this regard, the linkage assembly has first end pivotally secured proximate the distal end of the jaw. The linkage assembly is spring biased towards the open position. Further, the distal end of the jaw is inclined so as to permit flexion of the linkage assembly towards the restraint member. The second end of the linkage assembly is pivotally secured to the workhead. The workhead includes a pad for providing a point of contact with the workpiece. In the preferred embodiment, the pad is substantially planar. The first and second pivot points are in spaced relation to each other and are configured such that the radius between the central pivot point of the clamp and the first pivot point is greater than the radius between the central pivot point of the clamp and the second pivot point and further such that the second pivot points are disposed inside a line between the first pivot points when the pad engages the workpiece. This configuration results in application of a bidirectional vector force which has x- and y-component vectors upon closure of the jaws and engagement of the workheads against the workpiece.

United States published patent application No. 0005798 A1, filed by Kuchar, the entire disclosure of which is expressly incorporated herein by reference, shows a stud installation tool for installing a traction stud onto a resilient endless belt. The studs have a threaded shank with a terrain engaging end and an opposite end mounting an enlarged head which is adapted, when installed, to bear against an inner face of the endless belt. The threaded shank when installed is adapted to threadedly receive a threaded nut on the outer face of the endless belt. The stud installation tool comprises a pair of swingably coupled clamping heads moveable between spaced apart open positions and closed positions detachably clamped to the opposite sides of the belt. One of the clamping heads is detachably mounted to the enlarged head of the traction stud; the other of the clamping heads has an aperture therethrough for freely receiving the terrain engaging end when the clamping heads are in the closed position. Handles are provided for swingably moving the heads between the open and closed positions to push the terrain engaging end through the belt from the inside face to the outer face and clamp the stud while a tool fastens a fastener to the threaded shank.

BRIEF SUMMARY OF THE INVENTION

Depression of brake drum springs is a necessary and often arduous task when changing brake shoes on an automobile, truck, or other vehicle that has a brake shoe integral with a brake drum. The instant invention is a pliers-like action, where one jaw is especially adapted to depress the spring, utilizing a ring-like jaw where the ring is perpendicular to the spring. The opposite jaw has a blunt surface that is adapted to press against the brake drum itself while depressing the brake drum spring. An essential feature of the invention is the vice-grip like action of the handle portion of the tool, which enables the tool to be locked in position, holding the brake drum spring in a depressed state while changing the brake shoe.

It is an object of the instant invention to disclose a device particularly adapted to depress and lock the brake drum spring in place while the brake shoe is changed.

It is a further object of the instant invention to disclose a method of changing brake drum shoes using the locking device as invented by applicant.

DETAILED DESCRIPTION OF THE INVENTION

Figure 1:
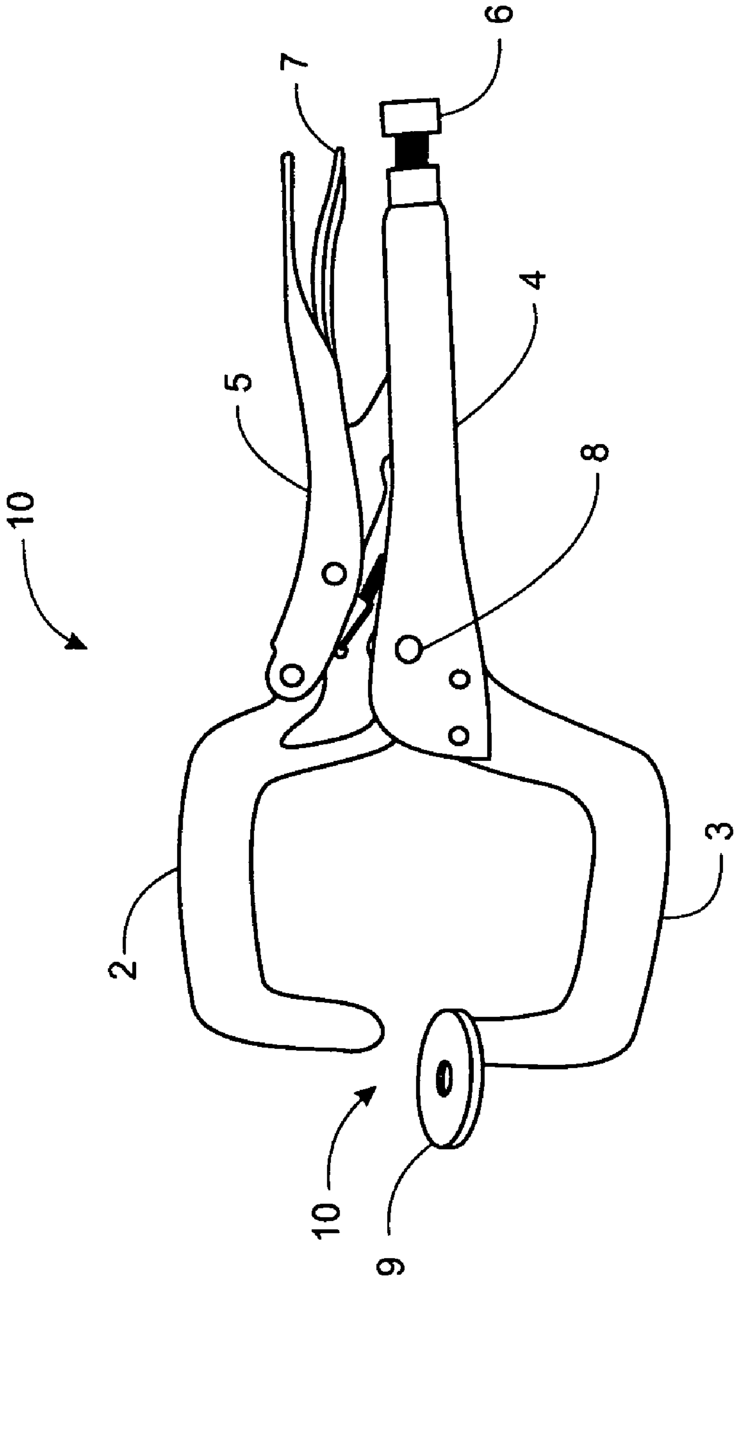
FIG. 1 shows the tool of the instant invention, in profile. The first jaw, with a ring perpendicular to a blunt second jaw are at the first terminal portion of the tool. Vice-grip like handle portions are seen at the second terminal portion of the tool.

The invention is best described in relation to the figures. Referring to FIG. 1, a locking tool constructed in accordance with the present invention, is illustrated generally as 1 in the figures. It will be appreciated by those skilled in the art that the invention incorporates a conventional locking c-clamp. The clamp 1, of the present invention, includes a handle 4, first and second opposing jaws 2 and 3, respectively, disposed proximate a distal end of the handle 4 and that are in spaced relation to one another, a jaw actuation lever 5 for actuating the jaws 1 and 2 proximate handle 4 and substantially parallel to the handle 4, a threaded adjusting screw 6 for selecting the spacing of the jaws 2 and 3 from one another when the jaws 2 and 3 are in the locked, or closed, position and toggle lock 7 for selectively locking and unlocking the jaws 2 and 3. Second opposing jaw 3 pivots, in relation to first jaw 2, about a central pivot point 8. First and second opposing jaws 2 and 3 each include a distal end 9 and 10, respectively. Pliers with locking mechanisms of the type used herein are well known in the art of pliers, and can be seen for instance in U.S. Pat. No. 6,000,686.

Distal end or ring 9 comprises a ring portion, that is attached to the end of jaw 3 eccentrically, so that the hollow center portion of the ring 9 is completely open. This facilitates the compression of the brake drum spring. It also acts to align the compressive force of jaw 2 in register with the compressive force of jaw 3. The offset location of ring 9 also leaves the workspace around the brake drum spring free of the jaw 3. Although the drawings show ring 9 as offset, it is contemplated that ring 9 could be attached in the center of the ring. It is also contemplated to use a continuous circular plate with no hole, in place of ring 9. The circular plate could be offset and eccentrically attached to the end of jaw 3; or the circular plate could be attached to the end of the jaw 3 at the center of the continuous circular plate.

Figure 2:
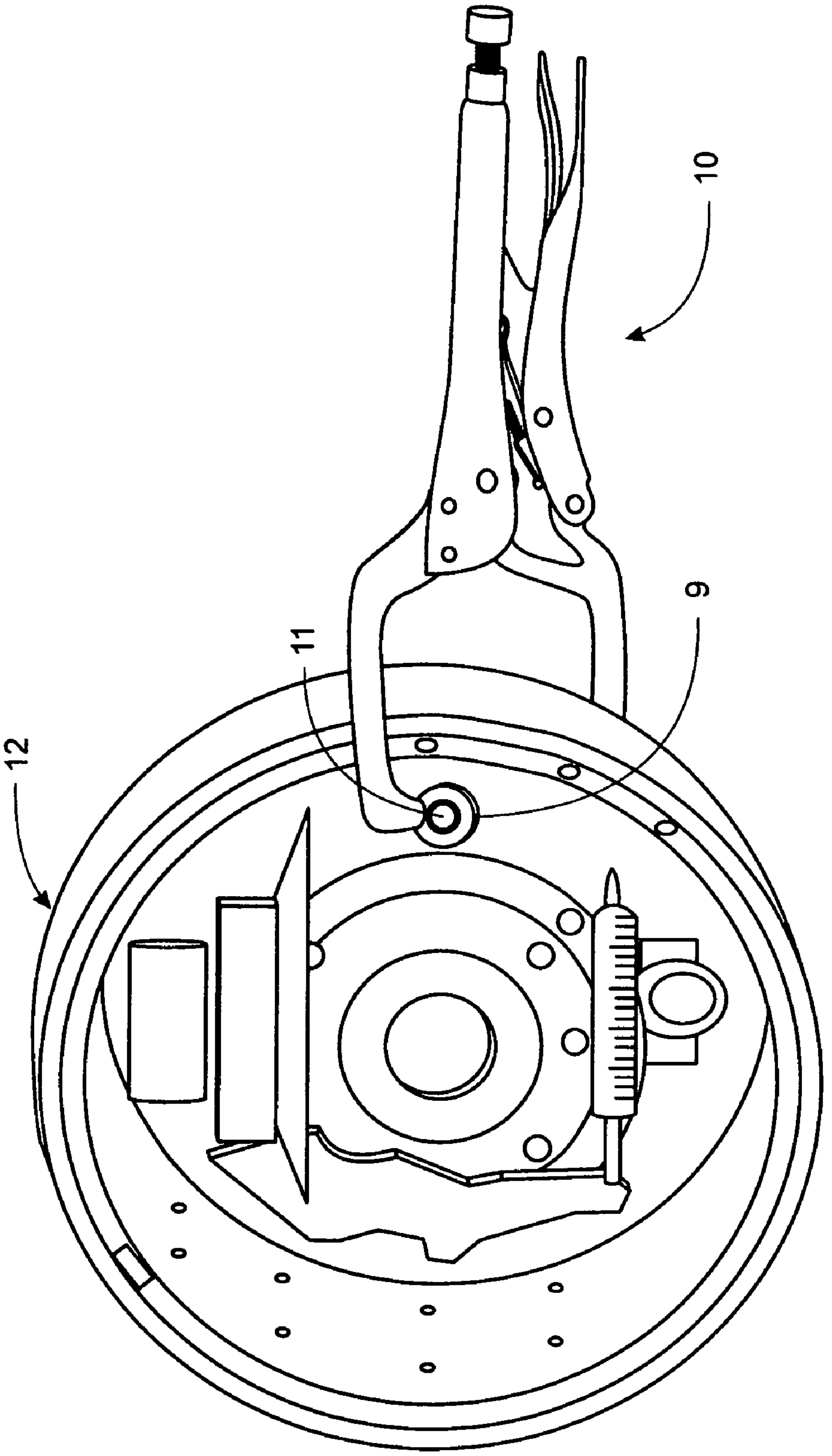
FIG. 2 shows the tool of the instant invention as it is used to depress a brake drum spring. The tool is locked in position, with the brake drum spring depressed.

FIG. 2 shows the tool 10 in operation. A brake drum 12 is shown, including spring 11. Spring 11 has been depressed by ring 9. The tool 1 is in locked position. This leaves the mechanics hands free to manipulate the brake shoe and replace the shoe using both hands unencumbered. After the brake shoe has been replaced, the tool 10 can be released, or unlocked, in the manner of unlocking a conventional locking c-clamp. Worn brake shoes are removed and new brake shoes are attached by depressing the brake drum springs with a c-clamp type tool, thereby depressing the brake drum springs out of the way of the mechanic, and removing the worn brake shoes while the brake drum springs are locked in a compressed state by the c-clamp device. Then new brake drum shoes are attached while the brake drum springs are locked in a compressed state by the c-clamp device. Next the c-clamp device is released and thereby releasing the brake drum springs. Finally, the c-clamp device is removed.

The invention claimed is:

1. A locking C-clamping device for compressing brake drum springs while changing brake shoes, comprising:

a handle;

first and second opposing elongated pivotal jaws disposed proximate a distal end of said handle, said first and second opposing jaws each having a distal end, said first and second opposing jaws being in spaced relation to one another, wherein said second jaw pivots in relation to said first jaw about a central pivot point located intermediate between said handle and said opposing elongated pivotal jaws;

a jaw actuation lever for actuating the jaws proximate said handle;

a threaded adjusting screw for selectively spacing of said first and second opposing jaws apart from one another when said first and second opposing jaws are in a closed position;

a toggle lock for selectively locking and unlocking said first and second elongated opposing jaws in said closed position;

said first opposing elongated pivotal jaw terminating in a circular plate having a diameter sized to engage and depress a brake drum spring, and the other opposing elongated pivotal jaw terminating in a blunt end of substantially lesser diameter than the circular plate and adapted to engage the brake drum when the brake drum spring is depressed by the opposing jaw having the circular plate, wherein the circular plate is a continuous plate and attached to the jaw eccentrically, said circular plate and blunt end being positioned on said jaws at a distance from the pivot so that the circular plate can be positioned on the brake drum spring and the blunt end on the brake drum in operative orientation whereby said C-clamping device may be operated with one hand by a mechanic changing brake shoes, and wherein the toggle lock securely locks the opposing jaws in a position that depresses the brake drum spring when the threaded adjusting screw has been adjusted to selectively space the first and second opposing jaws to the proper distance to engage the toggle lock.

2. A method of depressing brake drum springs, including removing worn brake shoes and attaching new brake shoes, comprising:

depressing the brake drum springs with a C-clamp type tool comprising:

a handle;

first and second opposing elongated pivotal jaws disposed proximate a distal end of said handle, said first and second opposing jaws each having a distal end, said first and second opposing jaws being in spaced relation to one another, wherein said second jaw pivots in relation to said first jaw about a central pivot point located intermediate between said handle and said opposing elongated pivotal jaws;

a jaw actuation lever for actuating the jaws proximate said handle;

a threaded adjusting screw for selectively spacing of said first and second opposing jaws apart from one another when said first and second opposing jaws are in a closed position;

a toggle lock for selectively locking and unlocking said first and second elongated opposing jaws in said closed position;

said first opposing elongated pivotal jaw terminating in a circular plate having a diameter sized to engage and depress a brake drum spring, and the other opposing elongated pivotal jaw terminating in a blunt end of substantially lesser diameter than the circular plate and adapted to engage the brake drum when the brake drum spring is depressed by the opposing jaw having the circular plate, wherein the circular plate is a continuous plate and attached to the jaw eccentrically, said circular plate and blunt end being positioned on said jaws at a distance from the pivot so that the circular plate can be positioned on the brake drum spring and the blunt end on the brake drum in operative orientation whereby said C-clamping device may be operated with one hand by a mechanic changing brake shoes, and wherein the toggle lock securely locks the opposing jaws in a position that depresses the brake drum spring when the threaded adjusting screw has been adjusted to selectively space the first and second opposing jaws to the proper distance to engage the toggle lock;

thereby depressing the brake drum springs out of the way of the mechanic;

removing the worn brake shoes while the brake drum springs are locked in a compressed state by the C-clamp device;

attaching new brake drum shoes while the brake drum springs are locked in a compressed state by the C-clamp device;

releasing the C-clamp device and thereby releasing the brake drum springs; and removing the C-clamp device.

3. A locking C-clamping device for compressing brake drum springs while changing brake shoes, comprising:

a handle;

first and second opposing elongated pivotal jaws disposed proximate a distal end of said handle, said first and second opposing jaws each having a distal end, said first and second opposing jaws being in spaced relation to one another, wherein said second jaw pivots in relation to said first jaw about a central pivot point located intermediate between said handle and said opposing elongated pivotal jaws;

a jaw actuation lever for actuating the jaws proximate said handle;

a threaded adjusting screw for selectively spacing of said first and second opposing jaws apart from one another when said first and second opposing jaws are in a closed position;

a toggle lock for selectively locking and unlocking said first and second elongated opposing jaws in said closed position;

said first opposing elongated pivotal jaw terminating in a circular plate having a diameter sized to engage and depress a brake drum spring, and the other opposing elongated pivotal jaw terminating in a blunt end of substantially lesser diameter than the circular plate and adapted to engage the brake drum when the brake drum spring is depressed by the opposing jaw having the circular plate, wherein the circular plate is a hollow ring and attached to the jaw eccentrically, said circular plate and blunt end being positioned on said jaws at a distance from the pivot so that the circular plate can be positioned on the brake drum spring and the blunt end on the brake drum in operative orientation whereby said C-clamping device may be operated with one hand by a mechanic changing brake shoes, and wherein the toggle lock securely locks the opposing jaws in a position that depresses the brake drum spring when the threaded adjusting screw has been adjusted to selectively space the first and second opposing jaws to the proper distance to engage the toggle lock.

* * * * *